(12) United States Patent
Takehara

(10) Patent No.: US 6,494,031 B2
(45) Date of Patent: Dec. 17, 2002

(54) GAS TURBINE APPARATUS WITH HEAT EXCHANGER

(75) Inventor: Isashi Takehara, Kobe (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 09/898,091

(22) Filed: Jul. 5, 2001

(65) Prior Publication Data

US 2002/0002820 A1 Jan. 10, 2002

(30) Foreign Application Priority Data

Jul. 7, 2000 (JP) ........................................ 2000-206644

(51) Int. Cl.[7] ............................................... F02C 7/10
(52) U.S. Cl. ..................................... 60/39.512; 60/798
(58) Field of Search .......................... 60/39.511, 39.512, 60/798

(56) References Cited

U.S. PATENT DOCUMENTS

| | | | |
|---|---|---|---|
| 3,713,294 A | * 1/1973 | Balje et al. | ........... 60/39.512 X |
| 3,811,495 A | * 5/1974 | Laing | .................. 60/39.512 X |
| 3,877,519 A | 4/1975 | Tramuta et al. | |
| 4,040,249 A | 8/1977 | Kahle et al. | |
| 4,177,638 A | * 12/1979 | Wood | ...................... 60/39.512 |
| 4,277,938 A | * 7/1981 | Belke et al. | ......... 60/39.512 X |

FOREIGN PATENT DOCUMENTS

| | | |
|---|---|---|
| EP | 0 796 986 A1 | 9/1997 |
| JP | 2-238132 A | 9/1990 |
| JP | 5-113133 | 5/1993 |

* cited by examiner

*Primary Examiner*—Hoang Nguyen
(74) *Attorney, Agent, or Firm*—Oliff & Berridge, PLC

(57) ABSTRACT

The heat exchanger for exchanging heat between compressed air ejected from the compressor and exhaust gas ejected from the turbine rotor is connected to the exhaust gas outlet side on the back portion of the gas turbine. The heat exchanger has the core having a plurality of heat transfer plates for partitioning the first paths for compressed air and the second paths for exhaust gas inside the casing. On the side of the back portion of the core, the first inlets for compressed air are formed and on the side of the front portion of the core, the outlets for compressed air are formed. Between the core and the casing, the introduction path for introducing compressed air into the first inlets is formed. Exhaust gas flowing into the second paths from a position in front of the core is ejected from the back of the core. No pipe for connecting the gas turbine and heat exchanger is required and miniaturization of the gas turbine apparatus and a reduction in cost can be realized.

5 Claims, 3 Drawing Sheets

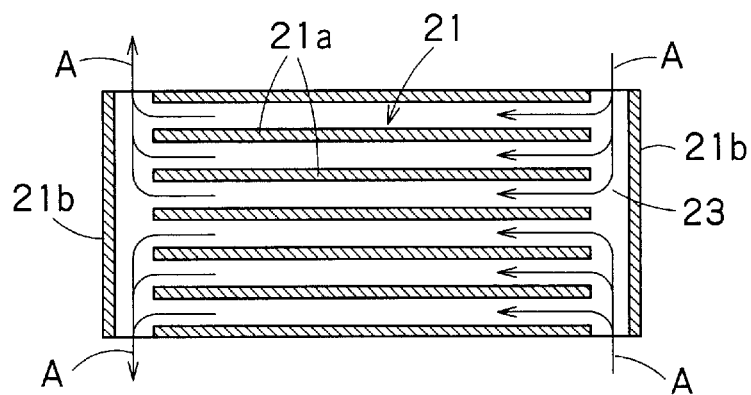
F I G. 4A
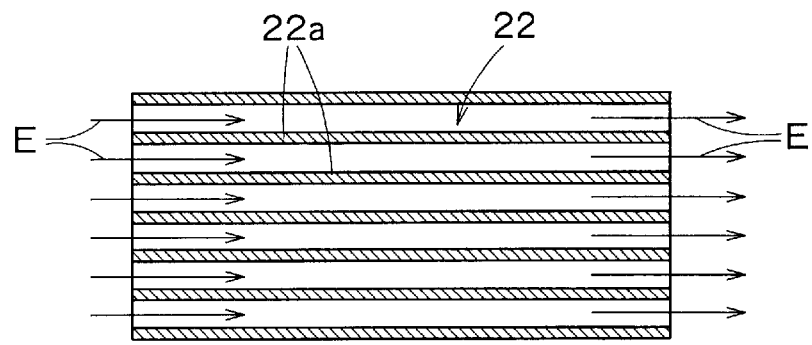
F I G. 4B
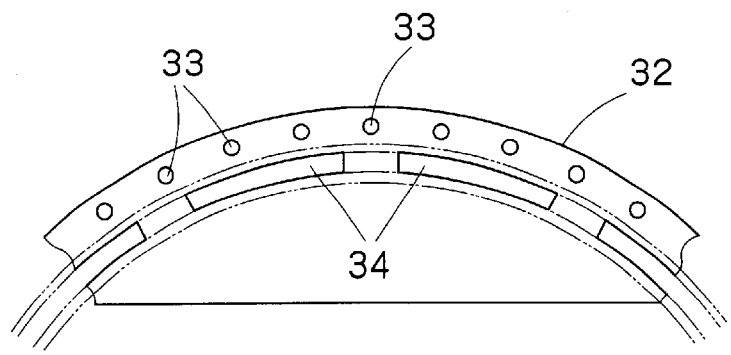
F I G. 5

GAS TURBINE APPARATUS WITH HEAT EXCHANGER

BACKGROUND OF THE INVENTION

1. Field of the Invention

The present invention relates to a gas turbine apparatus having a heat exchanger for exchanging heat between compressed air ejected from a compressor and exhaust gas ejected from a turbine.

2. Description of the Related Art

In some gas turbine, a heat exchanger is installed in order to increase the thermal efficiency and heat is exchanged between exhaust gas ejected from the turbine and compressed air before introduced into a combustor after ejected from a compressor. In this case, in order to introduce and eject compressed air from the compressor of the gas turbine into and from the heat exchanger, pipes are generally used. Accordingly, the energy loss of compressed air due to heat dissipation and frictional resistance in the pipes is increased and the whole size of the gas turbine apparatus is made larger.

On the other hand, a gas turbine apparatus with the heat exchanger that is directly connected to the back of the gas turbine so as to omit the pipes and to realize compactness is known. However, in this gas turbine apparatus, the combustor of the gas turbine is installed on the heat exchanger side. Therefore, when the type of combustor is changed, another heat exchanger corresponding to the combustor of new type must be prepared and the design of the heat exchanger must be changed in accordance with the type of combustor, resulting in increasing in cost.

The present invention was made with the foregoing in view and is intended to provide a gas turbine apparatus having a heat exchanger that no pipe is required, and efficiency improvement and structural compactness are realized, and the common heat exchanger can be used even if the type of combustor is changed, and the cost can be reduced.

SUMMARY OF THE INVENTION

To accomplish the above-mentioned object, the gas turbine apparatus of the present invention has: a gas turbine having a compressor, a combustor, and a turbine rotor; and a heat exchanger attached to said gas turbine for exchanging heat between a compressed air ejected from said compressor and an exhaust gas ejected from said turbine rotor, said heat exchanger being connected to an exhaust gas outlet side of a back portion of said gas turbine, said heat exchanger having a core including a front, a back and a side, and a casing enclosing said core, said core including a plurality of heat transfer plates that partition an internal space of said core into a first path for flowing said compressed air and a second path for flowing said exhaust gas. An inlet for flowing said compressed air into said first path is formed on said side of a back portion of said core. An outlet of said compressed air passing through said first path is formed on said side of a front portion of said core. An introduction path is formed between said core and said casing so that said compressed air is introduced through said introduction path from a position in front of said core via an outside of said side of said core into said inlet. Said exhaust gas is introduced from said front of said core into said second path and ejected from said back of said core.

According to the gas turbine apparatus aforementioned, the heat exchanger is connected to the exhaust gas outlet side of the back portion of the gas turbine including the combustor, and between the core of the heat exchanger and the casing, the introduction path for introducing compressed air into the inlet of the core from a position in front of the core via the outside of the side of the core is formed, and on the side of the front portion of the core, the outlet of compressed air passing through the first path is formed, so that a pipe for introducing compressed air into or ejecting the same from the heat exchanger is not necessary. As a result, the energy loss of compressed air by such pipe is eliminated and the whole gas turbine apparatus can be made compact. Moreover, the inner peripheral surface of the casing faces on the introduction path for flowing low-temperature compressed air, so that it can be expected that the casing is suppressed from high temperature and also heat of the heat dissipation from the core is recovered by compressed air in the introduction path. Further, on the back portion of the gas turbine including the combustor, the heat exchanger that is separately structured from the gas turbine is attached. Accordingly, regardless of the type of combustor, by use of the common heat exchanger, feed of exhaust gas to the heat exchanger, feed of compressed air ejected from the compressor to the heat exchanger, ejection of compressed air from the heat exchanger to the combustor, and ejection of exhaust gas from the heat exchanger can be carried out, thus designing is made easy and the cost can be reduced.

Preferably, an ejection path for ejecting said compressed air from said outlet into said combustor of said gas turbine in front of said core is formed on a radially inner position with respect to said introduction path. An inlet path for flowing said exhaust gas into said second path of said core is formed on a radially inner position with respect to said ejection path. An exhaust port for ejecting outside said exhaust gas passing through said second path is formed on a back of said heat exchanger.

According to this constitution, in front of the heat exchanger, the introduction path toward the heat exchanger for flowing low-temperature compressed air, the ejection path toward the combustor for flowing slightly high-temperature compressed air, and the exhaust gas inlet path for flowing very-high temperature exhaust gas to the heat exchanger are arranged in a triple structure from the radially outer position to the radially inner position, and exhaust gas passing through the heat exchanger is ejected outside from the back of the heat exchanger, so that the triple structure symmetrical with respect to the rotational axis of the gas turbine can be easily formed, for example, by a sheet metal. Namely, introduction of compressed air from the compressor to the heat exchanger, flowing of exhaust gas from the turbine to the heat exchanger, ejection of compressed air from the heat exchanger to the combustion chamber, and ejection of exhaust gas from the heat exchanger can be realized by a simple and compact structure. Moreover, since the exhaust gas inlet path, ejection path, and introduction path are arranged so that low-temperature gas sequentially flows from the radially inner position to the radially outer position, temperature rising of the outer periphery of the triple structure can be suppressed effectively and it can be expected that by heat exchange through the path wall such as the sheet metal aforementioned, compressed air ejected from the heat exchanger is heated by exhaust gas.

Preferably, said casing has a circular cross section. Said combustor is annular. Said casing and said combustor are arranged concentrically with respect to a rotational axis of said gas turbine.

In such a constitution, the location relationship of the gas turbine including the combustor and the heat exchanger behind the gas turbine can be set easily and precisely.

BRIEF DESCRIPTION OF THE DRAWINGS

In the drawings:

FIG. 4A is a sectional view of the first path of the core shown in FIG. 1;

FIG. 4B is a sectional view of the second path of the core shown in FIG. 1;

FIG. 5 is a front partial view showing the essential section of a connection flange of the core shown in FIG. 1.

The present invention will be understood more fully from the detailed description given hereunder and from the accompanying drawings of the preferred embodiments of the invention. However, the drawings are not intended to imply limitation of the invention to a specific embodiment, but are for explanation and understanding only.

DETAILED DESCRIPTION OF THE PREFERRED EMBODIMENT

The preferred embodiment of the present invention will be described in detail hereunder with reference to the accompanying drawings.

Figure 1:
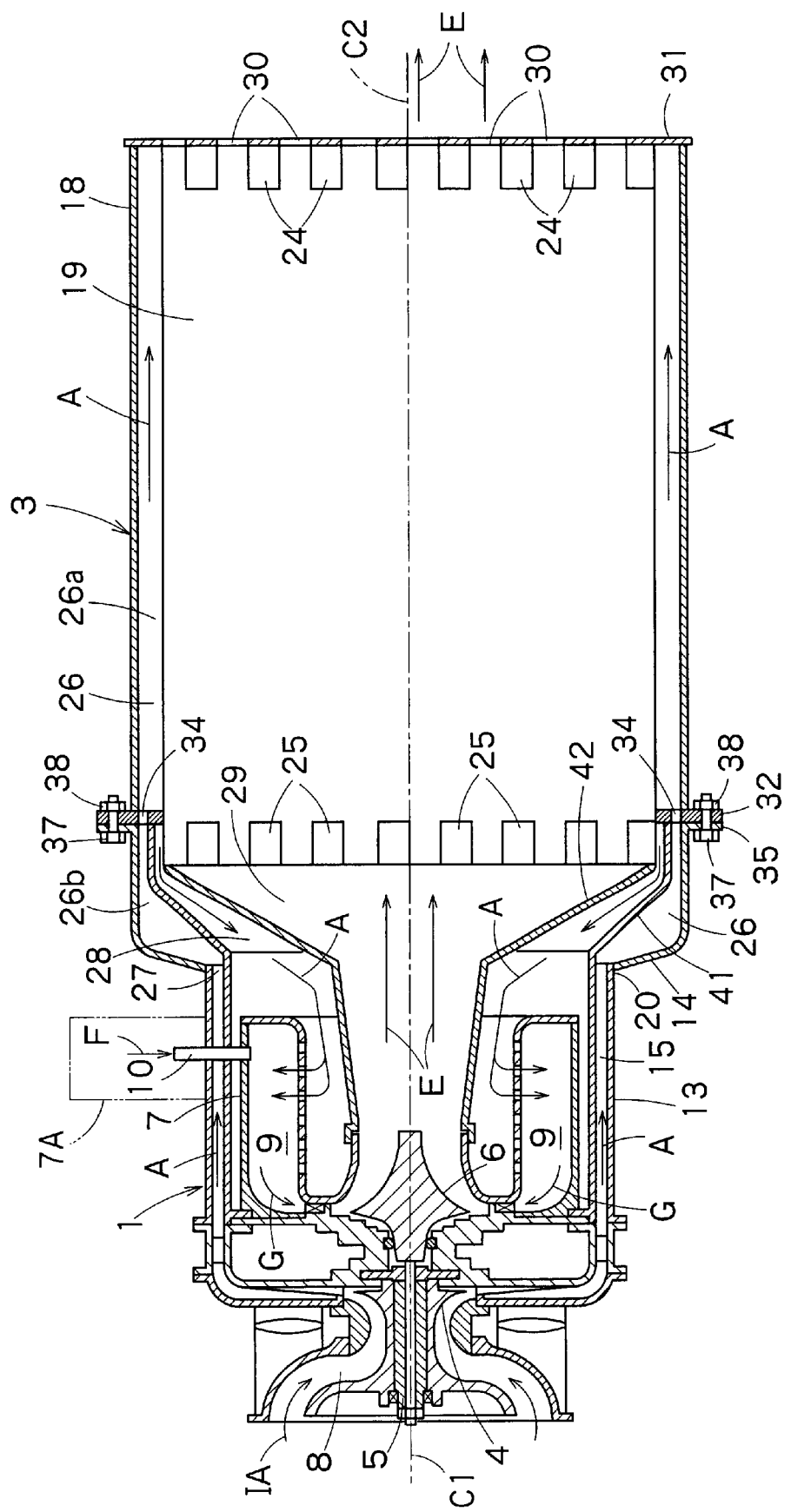
FIG. 1 is a longitudinal sectional view of a gas turbine apparatus according to an embodiment of the present invention.

As shown in FIG. 1, the gas turbine apparatus has a gas turbine 1 and a heat exchanger 3 connected to the exhaust gas outlet side of the back of the gas turbine 1.

The gas turbine 1 has a centrifugal compressor 4, a turbine rotor 6 fixed to the back end of a rotational shaft 5 of the compressor 4, and an annular combustor 7 positioned in the radial direction of the turbine rotor 6. The compressor 4 compresses air IA introduced from an intake air path 8 and feeds the compressed air A to the combustor 7 via the heat exchanger 3 connected to the back of the gas turbine 1 and is driven by the turbine rotor 6. The combustor 7 has a fuel nozzle 10 for injecting a jet of gas or liquid fuel F into a combustion chamber 9 in the combustor 7 and the fuel F is mixed with compressed air A fed into the combustion chamber 9 via the heat exchanger 3 and burns. High-temperature and high-pressure combustion gas G is fed to the turbine rotor 6 and the turbine rotor 6 is driven by the energy of combustion gas G. The combustor 7 is annular and arranged concentrically with the rotational axis C1 of the gas turbine 1. Only one fuel nozzle 10 of the combustor 7 may be installed or a plurality of fuel nozzles may be distributed and installed around the combustor 7. A load is connected to the front end of the rotational shaft 5.

Figure 2:
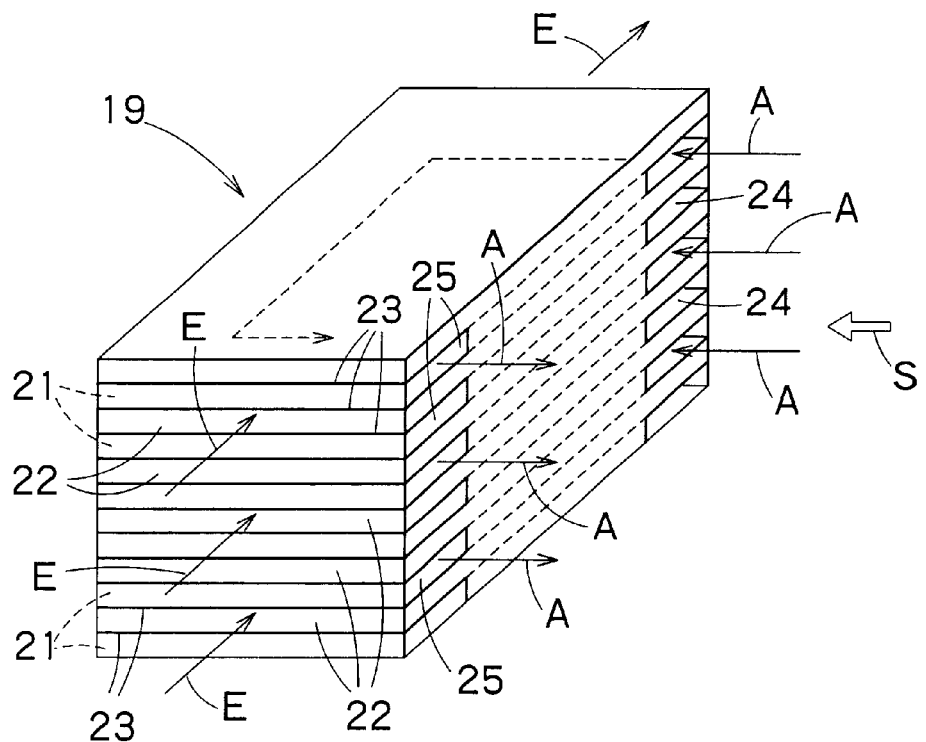
FIG. 2 is a perspective view of a core of a heat exchanger of the gas turbine apparatus shown in FIG. 1.
Figure 3:
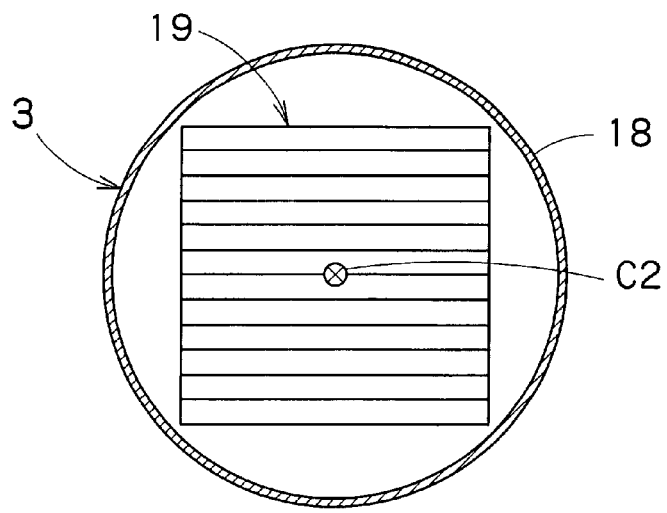
FIG. 3 is a front sectional view showing the rough constitution of the heat exchanger shown in FIG. 1.

The heat exchanger 3 exchanges heat between high-temperature exhaust gas E ejected from the turbine rotor 6 of the gas turbine 1 and low-temperature compressed air A ejected from the compressor 4 of the gas turbine 1. The heat exchanger 3 is structured so as to house a heat exchange core 19 having a rectangular cross section as shown in FIG. 2 inside a casing 18 having a circular cross section as shown in the cross sectional view in FIG. 3. The core 19 is structured by arranging a plurality of flat heat transfer plates 23 in parallel with each other at a predetermined interval so as to partition first paths 21 through which low-temperature compressed air A shown in FIG. 2 flows and second paths 22 through which high-temperature exhaust gas E flows. The heat transfer plates 23 are extended in parallel with the axis C2 of the casing 18 in the side view of FIG. 1 in the direction of S shown in FIG. 2. By doing this, the first paths 21 and the second paths 22 are alternately arranged while the heat transfer plates 23 are sandwiched between the first paths 21 and the second paths 22. The rotational axis C1 of the gas turbine 1 and the axis C2 of the casing 18 coincide with each other.

On the side of the back portion of the core 19, first inlets 24 for flowing compressed air A into the first paths 21 are formed. On the side of the front portion of the core 19, outlets 25 of compressed air A at a slightly higher temperature after passing through the first paths 21 are formed. FIG. 4A shows a cross sectional view of the first paths 21 which are cut in parallel with the plate surface of the heat transfer plates 23. The first paths 21 are partitioned into a plurality of paths by a plurality of partition plates 21a extending in the longitudinal direction of the paths. The front and back ends of the first paths 21 are closed by blind plates 21b. FIG. 4B is a cross sectional view of the second paths 22 which are cut in parallel with the plate surface of the heat transfer plates 23. The second paths 22 are also partitioned into a plurality of paths by a plurality of partition plates 22a extending in the longitudinal direction of the paths.

As shown in FIG. 1, between the core 19 and the casing 18, a main part 26a of an introduction path 26 for introducing compressed air A into the first inlets 24 via the outside of the side of the core 19 from a position in front of the core 19 is formed. By doing this, low-temperature compressed air A passing through the main part 26a of the introduction path 26 touches the casing 18 and the casing 18 can be suppressed from temperature rising. A housing 13 of the gas turbine 1 and the casing 18 of the heat exchanger 3 are connected with a connection casing 14. On the front of the connection casing 14, a second inlet 27 for flowing compressed air A into an inlet 26b of the introduction path 26 is formed. Between the housing 13 and the annular combustor 7 arranged in the radial direction of the turbine rotor 6, a compressed air flow path 15 for introducing compressed air ejected from the compressor 4 into the second inlet 27 is formed.

The housing 13 of the gas turbine 1 and the connection casing 14 may be integrally formed, or be separately formed and then connected to each other with a connection 20. Further, the connection casing 14 and the heat exchanger casing 18 may be integrally formed, or the gas turbine housing 13, the connection casing 14, and the heat exchanger casing 18 may be integrally formed.

Furthermore, on the front of the heat exchanger 3, on the radially inner position with respect to the introduction path 26, an ejection path 28 toward the combustor 7 for introducing compressed air A from outlets 25 of the heat exchanger 3 into the combustor 7 of the gas turbine 1 is formed. On the radially inner position with respect to the ejection path 28, an exhaust gas inlet path 29 for flowing exhaust gas E ejected from the turbine rotor 6 of the gas turbine 1 into the second paths 22 of the core 19 is formed. Namely, an intermediate partition 41 is installed on the radially inner position with respect to the connection casing 14 and an inside partition 42 is additionally installed on the radially inner position with respect to the inside partition 42 so as to form a triple tube structure. Thereby, on the front of the heat exchanger 3, that is, in front of the core 19, from the radially outer position to the radially inner position, the introduction path 26 for compressed air toward the heat exchanger formed between the connection casing 14 and the intermediate partition 41, the ejection path 28 for compressed air toward the combustor 7 formed between the intermediate partition 41 and the inside partition 42, and the exhaust gas inlet path 29 toward the heat exchanger formed inside the inside partition 42 are arranged trebly.

On the back of the heat exchanger 3, the back end of the core 19 is fixed to a back end plate 31 of the casing 18 and exhaust ports 30 for ejecting exhaust gas E passing through the second paths 22 backward outside is formed in the back end plate 31.

The front end of the casing 18 is positioned slightly backward from the outlets 25 of compressed air A on the front of the core 19 and fixed to a first flange 32 by welding. The first flange 32 supports the front of the core 19 to the casing 18 and as shown in the front view of the upper part thereof in FIG. 5, a plurality of bolt insertion through-holes 33 arranged in the circumferential direction are formed in the outer peripheral surface and a plurality of compressed air introduction ports 34 arranged in the circumferential direction are formed slightly inside the bolt insertion through-holes 33.

On the other hand, a second flange 35 is fixed to the back end of the connection casing 14 shown in FIG. 1 by welding. A plurality of bolt insertion through-holes (not shown in the drawing) matching to the plurality of bolt insertion through-holes 33 (FIG. 5) formed in the outer peripheral surface of the first flange 32 are formed in the second flange 35. The flanges 32 and 35 are joined air-tightly by bolts 37 and nuts 38 inserted into the bolt insertion through-holes of the flanges 32 and 35. Thereby, the connection casing 14 and the casing 18 are connected via the flanges 32 and 35 so that an annular space constituting the main part 26a of the introduction path 26 of compressed air A is reserved between the core 19 and the casing 18 and the inlet 26b of the introduction path 26 is reserved between the connection casing 14 and the intermediate partition 41.

The plurality of compressed air introduction ports 34 formed in the flange 32 of the core 19 shown in FIG. 5 form a part of the introduction path 26. The introduction path 26 is divided into the main part 26a and the inlet 26b by the compressed air introduction ports 34. The flange 32 closes the back end of the ejection path 28 toward the combustor 7 for ejecting compressed air A from the outlet paths 25 on the front of the core into the combustion chamber 9 of the gas turbine 1 and serves as a block member for blocking the ejection path 28 from the main part 26a of the introduction path 26.

As mentioned above, according to this embodiment, the front portion of the core 19 is supported by the casing 18 via the flange 32. However, the present invention is not limited to this structure and for example, the front portion of the core 19 may be supported by the casing 18 via a plurality of stays arranged in the circumferential direction.

In the gas turbine apparatus having such a constitution, the heat exchanger 3 exchanges heat between compressed air A ejected from the compressor 4 of the gas turbine 1 and exhaust gas E ejected from the turbine rotor 6 of the gas turbine 1. Accordingly, compressed air A at a high temperature is introduced into the combustor 7 of the gas turbine 1, so that the thermal efficiency of the gas turbine 1 improves.

Particularly, in this gas turbine apparatus, the heat exchanger 3 is connected to the exhaust gas outlet side on the back portion of the gas turbine 1, and between the core 19 and the casing 18 of the heat exchanger 3, the introduction path 26 for introducing compressed air A into first inlets 24 of the core 19 from a position in front of the core 19 via the outside of the side of the core 19 is formed, and on the side of the front portion of the core 19, the outlets 25 of compressed air A passing through the first paths 21 are formed. Therefore, no pipe for introducing compressed air A into the heat exchanger 3 and for ejecting the same from the heat exchanger 3 is required. As a result, the energy loss of compressed air A by the pipe is eliminated and the whole gas turbine apparatus can be made compact. Moreover, the inner peripheral surface of the casing 18 faces on the introduction path 26 for flowing low-temperature compressed air, so that the effect that the casing 18 is suppressed from high temperature and also heat of the heat dissipation from the core 19 is recovered by compressed air A in the introduction path 26 can be expected.

Further, the gas turbine 1 including the combustor 7 and the heat exchanger 3 are separately structured with each other, so that regardless of the type of combustor 7, by use of the common heat exchanger 3, feed of exhaust gas E to the heat exchanger 3, feed of compressed air A ejected from the compressor 4 to the heat exchanger 3, and ejection of exhaust gas E from the heat exchanger 3 can be carried out, thus designing is made easy and the cost can be reduced. Namely, in this embodiment, the annular combustor 7 is used. However, the present invention is not limited to this structure and for example, as indicated by a two-dot chain line as shown in FIG. 1, even when a single-can combustor 7A projected almost in the radial direction is used, the same heat exchanger 3 can be applied.

Further, in this gas turbine apparatus, the ejection path 28 for ejecting compressed air A from the outlets 25 of the core 19 into the combustor 3 of the gas turbine 1 is formed on the radially inner position with respect to the introduction path 26, and the exhaust gas inlet path 29 for flowing exhaust gas E into the second paths 22 of the core 19 is formed on the radially inner position with respect to the ejection path 28. Accordingly, the flowing paths 26, 28, and 29 are arranged in a triple structure from the radially outer position to the radially inner position. The exhaust ports 30 for ejecting exhaust gas E passing through the second paths 22 outside are formed on the back of the heat exchanger 3. Therefore, the triple structure aforementioned can be easily formed, for example, by a sheet metal. Namely, introduction of compressed air A from the compressor 4 to the heat exchanger 3, flowing of exhaust gas E from the turbine rotor 6 to the heat exchanger 3, ejection of compressed air A from the heat exchanger 3 to the combustion chamber 9, and ejection of exhaust gas E from the heat exchanger 3 can be realized by a simple and compact structure.

Furthermore, in this embodiment, the casing 18 has a circular cross section, and the combustor 7 is annular, and the casing 18 and combustor 7 are arranged concentrically with respect to the rotational axis C1 of the gas turbine 1, so that the location relationship of the gas turbine 1 including the combustor 7 and the heat exchanger 3 behind the gas turbine 1 can be set easily and precisely.

In this embodiment, a case that the core 19 of the heat exchanger 3 has a rectangular cross section is indicated. However, the present invention is not limited to this structure and for example, the core may have a hexagonal or circular cross section.

As mentioned above, in the gas turbine apparatus of the present invention, a pipe for introducing compressed air into the heat exchanger or for ejecting the same from the heat exchanger is not required, so that the energy loss of compressed air by the pipe is eliminated and the whole gas turbine apparatus can be made compact. Further, by low-temperature compressed air flowing in the introduction path along the inner peripheral surface of the casing, the casing is suppressed from high temperature, and also heat of the heat dissipation from the core is recovered by compressed air in the introduction path, thereby the thermal efficiency improves. Furthermore, separable heat exchanger is connected to the back portion of the gas turbine including the combustor, so that regardless of the type of combustor, the common heat exchanger can be used and the cost can be reduced.

When a triple structure is formed such as the ejection path for ejecting compressed air from the outlets of the core into the combustor of the gas turbine in front of the core is formed on the radially inner position with respect to the introduction path, the inlet path for flowing exhaust gas into the second paths of the core is formed on the radially inner position with respect to the ejection path, and the exhaust ports for ejecting exhaust gas passing through the second paths outside are formed on the back of the heat exchanger, the triple structure can be easily formed, for example, by a sheet metal.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A gas turbine apparatus comprising:

a gas turbine having a compressor, a combustor, and a turbine rotor; and a heat exchanger attached to said gas turbine for exchanging heat between a compressed air ejected from said compressor and an exhaust gas ejected from said turbine rotor, said heat exchanger being positioned axially rearward with respect to said gas turbine and connected to an exhaust gas outlet side of a back portion of said gas turbine, said heat exchanger having a core including a front, a back and an outer side, and a casing enclosing said core, said core including a plurality of heat transfer plates that partition an internal space of said core into a first path for flowing said compressed air and a second path for flowing said exhaust gas, wherein an inlet for flowing said compressed air into said first path is formed on said outer side of a back portion of said core, wherein an outlet of said compressed air passing through said first path is formed on said outer side of a front portion of said core, wherein an introduction path is formed in an annular shape between said core and said casing so that said compressed air is introduced through said introduction path from a position in front of said core via a circumferential outside around said outer side of said core into said inlet, and wherein said exhaust gas is introduced from said front of said core into said second path and ejected from said back of said core.

2. A gas turbine apparatus according to claim 1, wherein an ejection path for ejecting said compressed air from said outlet into said combustor of said gas turbine in front of said core is formed on a radially inner position with respect to said introduction path, wherein an inlet path for flowing said exhaust gas into said second path of said core is formed on a radially inner position with respect to said ejection path, and wherein an exhaust port for ejecting outside said exhaust gas passing through said second path is formed on a back of said heat exchanger.

3. A gas turbine apparatus according to claim 1, wherein said casing has a circular cross section, wherein said combustor is annular, and wherein said casing and said combustor are arranged concentrically with respect to a rotational axis of said gas turbine.

4. A gas turbine apparatus according to claim 2, wherein said casing has a circular cross section, wherein said combustor is annular, and wherein said casing and said combustor are arranged concentrically with respect to a rotational axis of said gas turbine.

5. A gas turbine apparatus according to claim 1, wherein an ejection path for ejecting said compressed air from said outlet into said combustor of said gas turbine in front of said core is formed on a radially inner position with respect to said introduction path, and wherein an inlet path for flowing said exhaust gas into said second path of said core is formed on a radially inner position with respect to said ejection path.

* * * * *